US010286547B2

(12) United States Patent
Takaichi et al.

(10) Patent No.: US 10,286,547 B2
(45) Date of Patent: May 14, 2019

(54) ROBOT CONTROL SYSTEM

(71) Applicant: OMRON Corporation, Kyoto (JP)

(72) Inventors: Ryuichiro Takaichi, Otsu (JP); Hiroyuki Inoue, Kyoto (JP); Takamasa Yamaji, Kusatsu (JP); Teruki Yamada, Nara (JP)

(73) Assignee: OMRON Corporation, Kyoto (JP)

( * ) Notice: Subject to any disclaimer, the term of this patent is extended or adjusted under 35 U.S.C. 154(b) by 162 days.

(21) Appl. No.: 15/320,310

(22) PCT Filed: Jun. 19, 2015

(86) PCT No.: PCT/JP2015/067701
§ 371 (c)(1),
(2) Date: Dec. 19, 2016

(87) PCT Pub. No.: WO2015/194658
PCT Pub. Date: Dec. 23, 2015

(65) Prior Publication Data
US 2017/0144297 A1 May 25, 2017

(30) Foreign Application Priority Data
Jun. 20, 2014 (JP) ................. 2014-127669

(51) Int. Cl.
*G01C 21/00* (2006.01)
*B25J 9/00* (2006.01)
(Continued)

(52) U.S. Cl.
CPC ........... *B25J 9/0084* (2013.01); *B25J 9/0096* (2013.01); *B25J 9/1656* (2013.01); *B25J 13/006* (2013.01);
(Continued)

(58) Field of Classification Search
CPC ...... B25J 9/0084; B25J 13/006; B25J 9/1656; B25J 9/0096; B25J 19/00; B25J 13/06;
(Continued)

(56) References Cited

U.S. PATENT DOCUMENTS

2003/0034435 A1* 2/2003 Etienne-Cummings ..................... G06K 9/605
250/208.1
2005/0004707 A1* 1/2005 Kazi ..................... B25J 9/1682
700/245
(Continued)

FOREIGN PATENT DOCUMENTS

| CN | 1853877 | 11/2006 |
|---|---|---|
| CN | 103056884 | 4/2013 |

(Continued)

OTHER PUBLICATIONS

"Search Report of Europe Counterpart Application", dated Jan. 3, 2018, p. 1-p. 9, in which the listed references were cited.
(Continued)

*Primary Examiner* — Ian Jen
(74) *Attorney, Agent, or Firm* — JCIPRNET

(57) ABSTRACT

A robot control system comprising a plurality of robots and a worker terminal that is capable of sending operation commands to a plurality of robots, by using wireless communications. The worker terminal has: an identification part that identifies a target robot to be used for work, from among a plurality of robots; a reception part that receives operation instructions for the robot from a worker; and a wireless communications part that sends operation commands to only the robot identified as the target robot by the identification part, when an operation instruction is received by the reception part.

9 Claims, 11 Drawing Sheets

(51) Int. Cl.
*B25J 13/06* (2006.01)
*B25J 19/00* (2006.01)
*B25J 9/16* (2006.01)
*B25J 13/00* (2006.01)

(52) U.S. Cl.
CPC .............. *B25J 13/06* (2013.01); *B25J 19/00* (2013.01); *G05B 2219/33192* (2013.01); *G05B 2219/39448* (2013.01); *G05B 2219/40131* (2013.01); *G05B 2219/40205* (2013.01)

(58) Field of Classification Search
CPC .......... G05B 2219/39448; G05B 2219/33192; G05B 2219/40205; G05B 2219/40131
See application file for complete search history.

(56) References Cited

U.S. PATENT DOCUMENTS

| | | | |
|---|---|---|---|
| 2005/0043898 A1* | 2/2005 | Linsen | G01J 3/52 702/22 |
| 2005/0052148 A1 | 3/2005 | Carlson et al. | |
| 2005/0219114 A1* | 10/2005 | Kawabe | G01S 1/70 342/47 |
| 2006/0136097 A1* | 6/2006 | Kim | G05D 1/0234 700/258 |
| 2006/0271209 A1 | 11/2006 | Calcagno | |
| 2009/0299524 A1* | 12/2009 | Evans | B25J 9/1656 700/248 |
| 2010/0161141 A1* | 6/2010 | Herre | G05B 23/0264 700/283 |
| 2013/0035697 A1 | 2/2013 | Ogawa et al. | |

FOREIGN PATENT DOCUMENTS

| | | |
|---|---|---|
| CN | 103717169 | 4/2014 |
| DE | 102009056640 | 8/2010 |
| EP | 1716983 | 11/2006 |
| JP | H09-085661 | 3/1997 |
| JP | 2003-080482 | 3/2003 |
| JP | 2003200371 | 7/2003 |
| JP | 2004-243427 | 9/2004 |
| JP | 2004-291186 | 10/2004 |
| JP | 2006277531 | 10/2006 |
| JP | 2006-297589 | 11/2006 |
| JP | 2008080474 | 4/2008 |
| WO | 02078914 | 10/2002 |
| WO | 2009071567 | 6/2009 |
| WO | 2010082842 | 7/2010 |
| WO | 2013018861 | 2/2013 |

OTHER PUBLICATIONS

"Office Action of Japan Counterpart Application," with machine English translation thereof, dated Sep. 19, 2017, p. 1-p. 11, in which the listed references were cited.

"Office Action of China Counterpart Application," with English translation thereof, dated Jun. 19, 2018, p. 1-p. 15.

* cited by examiner

ROBOT CONTROL SYSTEM

CROSS-REFERENCE TO RELATED APPLICATION

This application is a 371 of international application of PCT application serial no. PCT/JP2015/067701, filed on Jun. 19, 2015, which claims the priority benefit of Japan application no. 2014-127669, filed on Jun. 20, 2014. The entirety of each of the abovementioned patent applications is hereby incorporated by reference herein and made a part of this specification.

BACKGROUND OF THE INVENTION

1. Field of the Invention

The present invention relates to a production mode in which a worker works by using a plurality of robots.

2. Description of Related Art

With diversification of customer needs, in the manufacturing site, it is urgent to deal with multi-item small sized production, short-term production, variable production and so on. In such environment changes, there are more enterprises that change from a linear production mode of configuring workers or robots along a belt conveyor to an artificial-assembly-based small-scale production mode such as cell production mode. The cell production mode refers to that working platforms of various procedures such as machining, assembling, inspection and packing are configured in a manner of surrounding a work space of workers, and one (or several) worker/workers manufactures/manufacture products while moving between the working platforms.

Recently, in order to achieve manpower saving and labor saving in the small-scale production mode, there are examples of importing dual-arm robots that can perform multiple tasks of the same work as the humans in place of the workers. For example, a production mode is proposed in Patent Document 1 that multiple workers and multiple dual-arm robots are configured according to procedures and the workers or dual-arm robots adjacent to each other manufacture products while transferring workpieces.

PRIOR ART DOCUMENT

Patent Document

Patent Document 1: International Publication No. 2009/071567

SUMMARY OF THE INVENTION

Problem to be Solved in the Invention

However, work in various procedures of the small-scale production mode is varied, and some work requires detailed activities or advanced judgment that can be implemented only by the humans. Therefore, when the work to be performed by the humans is totally switched to the dual-arm robots, high-performance and high-intelligence robots including multiple sensors and special hands are required. Therefore, problems exist such as development and teaching of the robots take time and starting of a production line takes time, and the import cost or maintenance cost is high so that it is not easy to obtain investment interest.

Therefore, the invention studies a production mode in a new form in which the humans are not replaced with robots but the humans and the robots give play to their own advantages to jointly accomplish one work. That is to say, detailed activities or parts requiring adaptable (flexible) judgment are in the charge of the worker, simple operations or operations requiring accuracy are in the charge of the robots, and the workers and the robots cooperatively work in the same work space.

For example, suppose that, in the case of the work of screwing a cable inside a product, it is inappropriate for the robots to carry out an activity of aligning cable positions as screwing objects in a narrow (complicated) space inside the product. On the other hand, it is appropriate for the robots to perform simple operations such as screwing, and if they are performed by the workers, bad possibility such as oblique insertion or mistaken torque may occur. In this case, the workers align and press the cable positions, and in this state, the robots perform screwing.

Improvement of operation efficiency and accuracy can be expected if the humans and the robots are in charge of respective skilled activities. Moreover, they may be robots much simpler than the dual-arm robots, and thus the import cost or maintenance cost can be reduced significantly.

To implement cooperative work between humans and robots, timing of human operations and robot operations has to cooperate well. Ideally, when the worker is ready (e.g., after the cables are aligned to the specified position and fixed), the worker sends an operation command (e.g., a screwing execution command) to the robot. As an implementation method thereof, it is considered that, for example, the command is sent wirelessly to the robot from a terminal that the worker wears or carries, or the command is input by an input device through gesture input, operation input, sound input or other non-contact manner.

However, when such composition is applied to a cell production mode, a new problem as follows will be encountered. Suppose that special robots corresponding to respective work are disposed on a plurality of working platforms in a cell, the worker cooperatively works with the robots while moving between the working platforms. At this point, from the viewpoint of availability (operability) and work efficiency, it is ideal that the operation instruction can be sent in the same manner for any robot. However, as the plurality of robots is closely configured in a limited space, when the above wireless communications or non-contact input is utilized, the operation command from the worker may be received by other robots or the plurality of robots, and thus it is likely that a robot not implied by the worker operates incorrectly.

The present invention is accomplished in view of the issue, directed to providing a technology for achieving a production mode in which a worker efficiently works while distinguishing robots for each work in a work space provided with a plurality of robots.

Means of Solving the Problem

To achieve the objective, the present invention employs the following composition.

That is to say, a robot control system of the present invention is used for causing a worker to use a plurality of robots to distinguish work in a work space provided with the robots, wherein the robot control system includes: a plurality of robots; and a worker terminal that is capable of sending operation commands to the plurality of robots, by using wireless communications; the worker terminal has: an identification part that identifies a target robot to be used for work, from among a plurality of robots; a reception part that receives operation instructions for the robot from a worker; and a wireless communications part that sends operation commands to only the robot identified as the target robot by the identification part, when an operation instruction is received by the reception part.

According to the composition, operation commands are sent to only the robot identified as the target robot by the identification part, and thus malfunction of the robot not implied by the worker may be prevented. Moreover, as the operation commands are sent to the target robot according to the operation instruction of the worker, the target robot can operate with the timing required by the worker, which thus can implement efficient work.

Here, the worker and the robots are preferably in a relationship of cooperative work. Cooperative work refers to that some of multiple operations required for achieving one work are performed by the worker and the rest are performed by the robot. The operations undertaken by the worker and the operations undertaken by the robot sometimes are performed simultaneously or synchronously, and sometimes are performed successively in time. Moreover, as a method of "sending operation commands to only the robot identified as the target robot", it may be a method of "sending operation commands to the target robot without sending the operation commands to other robots" and may also be a method of "multicast sending operation commands including information that specifies the target robot to all the robots, wherein the robot judge whether they are operation commands specific to themselves".

Preferably, a target robot prompt part is further included, which prompts information indicating which of the plurality of robots is identified as the target robot. By seeing the prompted information, the worker can confirm whether the implied robot is selected as the target robot, and thus work safety can be ensured.

Preferably, the target robot prompt part prompts the information indicating which of the plurality of robots is identified as the target robot, with a pattern that can be seen by the worker and a third party other than the worker. Not only can the worker see the target robot, but also the third party can see the target robot. Thus, work safety and normal operation of the system can be managed and monitored objectively.

Preferably, the plurality of robots is assigned with identification colors respectively, and the target robot prompt part is an element lit on in a color the same as an identification color of the target robot. Through identification according to colors, the robots can be distinguished directly and accurately.

Preferably, the plurality of robots each has an identification color display part that displays an identification color, the worker terminal has a see-through head-mounted display, and the target robot prompt part is an element that makes an image in a color the same as that of the identification color of the target robot displayed on the head-mounted display, or an element mounted on the head-mounted display that shines in a color the same as that of the identification color of the target robot within the field of view of the worker. According to the composition, the worker sees the identification color display parts of the robots across the head-mounted display, and only by comparing colors displayed or shining at the head-mounted display side with colors of the identification color display parts of the robots, the worker terminal can directly and immediately confirm whether the robot identified as the target robot is consistent with the robot implied by the worker.

The identification part may identify the target robot with any method. Preferably, for example, the plurality of robots each has a robot identification mark recording a robot ID, the worker terminal has a reader that reads the robot ID from the robot identification mark, and the identification part identifies the target robot by reading the robot ID from the robot identification mark within a read range of the reader. Alternatively, preferably, the worker terminal has a terminal identification mark recording a terminal ID, the plurality of robots each has a reader that reads the terminal ID from the terminal identification mark, and an ID notification part that notifies a worker terminal specific to the terminal ID read by the reader about its own robot ID, and the notification part identifies the target robot by obtaining the robot ID from the ID notification part. As "robot identification mark" and "terminal identification mark", for example, integrated circuit (IC) tags and two-dimensional codes and the like can be used. When the IC tags are used as the identification marks, the "reader" is a Radio Frequency Identification (RFID) reader, and when the two-dimensional codes are used as the identification marks, the "reader" is a camera.

Preferably, the plurality of robots each has a human-sensing sensor and a control part, and the control part stops communication with the worker terminal or operation of the robot when the human-sensing sensor detects that the worker is not within an available range of the robot. Thus, malfunction of the robot can be further suppressed, thus ensuring the work safety.

Preferably, the plurality of robots each is a robot that uses receiving of an operation command from the worker terminal as a trigger to perform a determined operation, and the operation instruction can be input with the same operation no matter which robot the target robot is. Any robot can input the operation instruction with the same operation, and thus availability (operability) and work efficiency of the worker can be enhanced.

In addition, the present invention may be used as a robot control system including at least one part of the composition. Moreover, the present invention may also be used as a robot control method or a robot cooperative work production method including at least one part of the processing, or a program for causing a computer to perform the method or a computer-readable storage medium that stores the program not temporarily. The composition and the processing can be combined with each other to constitute the present invention as long as they are not technically contradictory.

Effect of the Invention

According to the present invention, a production mode in which a worker efficiently works while distinguishing robots for each work in a work space provided with a plurality of robots can be implemented.

DESCRIPTION OF THE EMBODIMENTS

The present invention relates to a technology for causing a robot required by a worker in a plurality of robots disposed in a limited work space to operate with required timing, especially suitable for a production mode in a new form in which humans and robots cooperate for one work while giving play to their own advantages. In the following embodiment, an example of a cell production line applied to product assembling, inspection and packing in the present invention is described.

(Cell Production Line)

The cell production mode refers to that a plurality of working platforms corresponding to various procedures are configured in a manner of surrounding a work space of workers, and one or several workers manufacture products while moving between the working platforms. There are several changes in configuration of the working platforms, but the most common form is configuring the working platforms to be in a U-shaped form.

Figure 1:
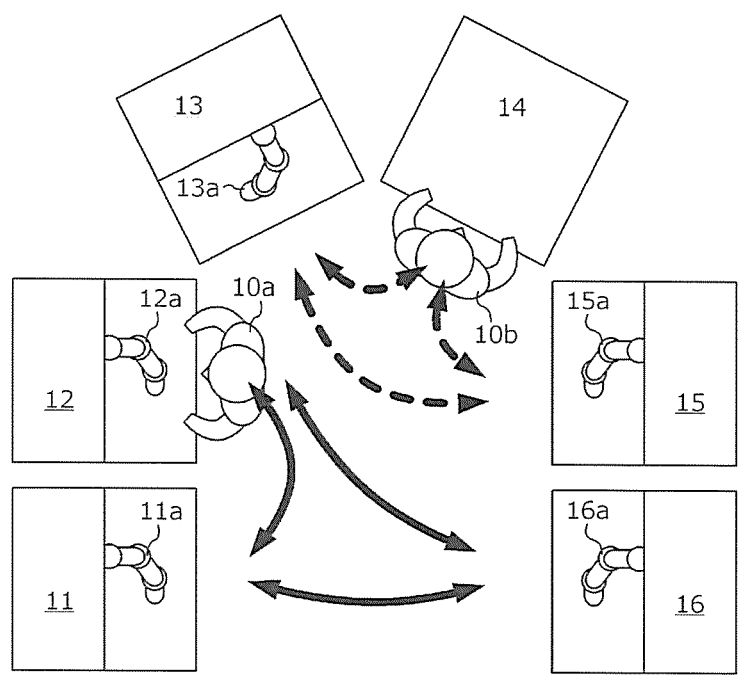
FIG. 1 is a diagram of an example of a cell production line.

FIG. 1 is a schematic diagram of a cell production line that uses a robot control system according to the present embodiment. FIG. 1 is a top view that observes cells from above. Six working platforms 11-16 are configured to be U-shaped, indicating a condition that five working platforms 11, 12, 13, 15 and 16 except the working platform 14 are provided with robots 11*a*, 12*a*, 13*a*, 15*a* and 16*a* that assist workers 10*a* and 10*b* in work.

The working platforms 11-16 are places where various operation procedures such as (1) parts assembling, (2) cable bundling, (3) screwing, (4) inspection, (5) packing preparation and (6) packing and moving out are performed respectively. (1) parts assembling, (2) cable bundling and (6) packing and moving out are undertaken by the worker 10*a*, and (3) screwing, (4) inspection and (5) packing preparation are undertaken by the worker 10*b*.

(1) Parts Assembling

On the working platform 11, the robot 11*a* picks up parts from a part rack according to an instruction (signal) of the worker 10*a*, and transmits parts to the worker 10*a* (or configures the parts in specified positions). The worker 10*a* assembles the parts inside the housing of the workpiece, and moves towards the working platform 12 along with the workpiece.

(2) Cable Bundling

On the working platform 12, the robot 12*a* picks up a bundling band from a stocker according to an instruction (signal) of the worker 10*a*, and transmits the bundling band to the worker 10*a*. The worker 10*a* clusters cables inside the housing of the workpiece and bundles them with a bundling band. Then, the worker 10*a* hands over the workpiece to the next working platform 13.

(3) Screwing

On the working platform 13, the worker 10*b* sends an instruction (signal) to the robot 13*a* in a state that the workpiece is configured in a specified position and parts as screwing objects are pressed or the cables are fixed. Then, the robot 13*a* makes an electric driver vertically drop, and performs screwing. When there are multiple screwing positions, the same work is repeated.

(4) Inspection

On the working platform 14, the worker 10*b* visually inspects the screwed workpiece. In the example, parts assembling, cable bundling, screw fastening, stain and scratches of the appearance of the workpiece are confirmed, and if there is no problem, the workpiece is configured on a finishing stand between the working platform 14 and the working platform 15.

(5) Packing Preparation

On the working platform 15, after the worker 10*b* assemblies a packing box and configures it in a specified position, if an instruction (signal) is sent to the robot 15*a*, the robot 15*a* picks up the workpiece from the finishing rack, disposes it in the packing box, and places a packing component into the packing box.

(6) Packing and Moving Out

On the working platform 16, after the worker 10*a* bends an upper cover plate of the packing box and fixes it, if an instruction (signal) is sent to the robot 16*a*, the robot 16*a*, after clamping the upper cover of the packing box, disposes it on a specified move-out rack.

As described above, two workers 10*a* and 10*b* cooperatively work with the required robots while moving between the working platforms, to perform the work of assembling products and packing the products. In addition, the composition of the cell production line, the number of the working platforms or the workers, the work contents, the work in the charge of the workers and the robots and the like described herein are merely one example.

However, when the production mode is implemented, there are several issues to be solved for interaction between the workers and the robots. The first issue is to implement a composition of transferring a worker's instruction (signal) to the robots with required timing (that is, the timing at which the workers complete preparations). The second issue is to implement an operating interface that sends an instruction to the robots according to a natural operation flow (that is, a method in which the worker's activity or time almost has no loss). The compositions are important for the workers and the robots to tacitly cooperate and achieve efficient and accurate production. Besides, the third issue is to implement a composition that a worker feasibly sends an instruction to only an implied robot (a target robot for cooperative work). The reason lies in that when the worker 10*a* intends to perform cable bundling on the working platform 12 and sends an instruction to the robot, if other robots operate incorrectly, it may not only lead to work loss, but also lead to safety and sanitation problems.

In the robot control system of the embodiment, to solve the issues, a composition that the workers use a worker terminal with a wireless communication function and send an operation command (operation trigger) to the robots through wireless communication is employed, and a composition that the worker terminal identifies a target robot for cooperative work and selectively sends operation commands to only the target robot is implemented. Specific compositions of the compositions are described below.

First Embodiment (Working Platform and Robot)

Figure 2:
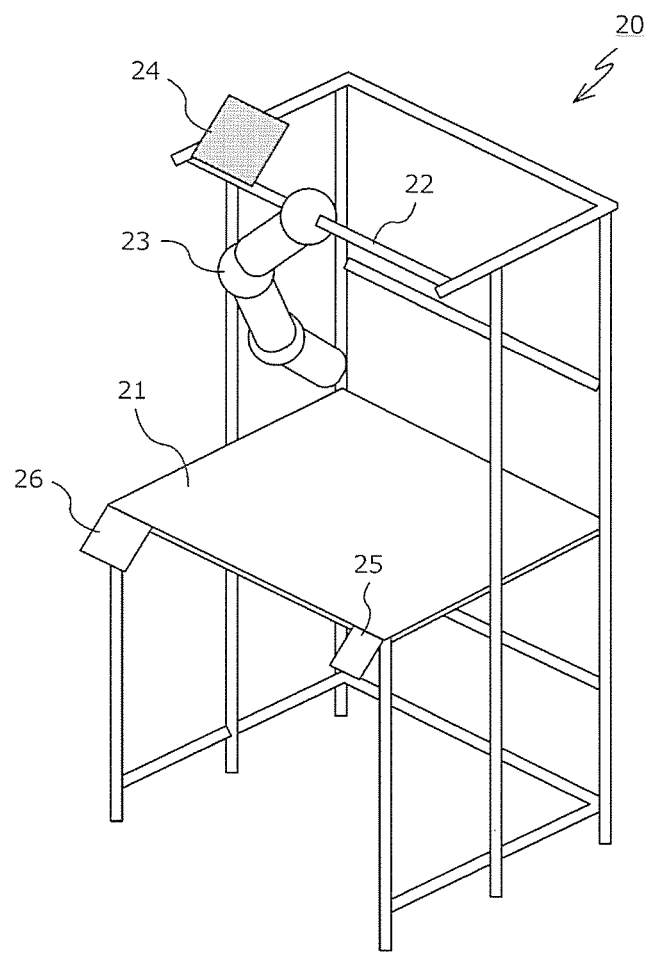
FIG. 2 is a three-dimensional diagram that schematically indicates a composition example of a working platform according to a first embodiment.

The composition of the working platforms (11, 12, 13, 15 and 16 in FIG. 1) provided with robots is described. FIG. 2 is a three-dimensional diagram that schematically indicates a composition example of a working platform.

The working platform 20 is formed by connecting a metal tube with a joint and assembling a top plate 21 or a required frame plate. A horizontal rail 22 is disposed on an upper part of the working platform 20, and a robot 23 is mounted to the horizontal rail 22.

The robot 23 of the embodiment does not need an advanced function as the dual-arm robot as long as it can perform simple assisted operations such as transferring objects or screwing as described above. Therefore, a simple and low-cost robot (e.g., a single-arm multi-joint robot) can be used. When cooperative work between the worker and the robot is implemented, preferably, the robot 23 is disposed on an upper part or a top plate of the working platform 20 or the like according to an operation route of the worker and the requirement of ensuring a work space. Herein, the robot may be lightweight by simplifying the function (effect) and composition of the robot 23. Therefore, it is easy to dispose the robot 23 on the horizontal rail 22 or the top plate (not shown) of the working platform 20.

The robot 23 has an identification color display part 24. Identification colors (e.g., red, green, blue, dark red, yellow) different from each other for identifying robots are assigned to the five robots (11*a*, 12*a*, 13*a*, 15*a*, 16*a*) shown in FIG. 1. When communication is established between the worker terminal that the worker wears and the robot 23, the identification color display part 24 is lit on (shines) with an identification color assigned to the robot 23. Detailed description will be given below. The identification color display part 24 may include a luminescent screen including a light emitting diode (LED), a liquid crystal display, an organic electroluminescence (EL) display and so on.

Moreover, an IC tag 25 as a robot identification mark is mounted to the top plate 21 of the working platform 20. A robot ID assigned to the robot 23 is recorded on the IC tag 25. For the robot ID, like the identification color, different IDs are assigned to respective robots to identify the five robots.

Moreover, the working platform 20 is provided with a human-sensing sensor 26. The human-sensing sensor 26 is a sensor for sensing whether the worker is near the working platform 20 (that is to say, within an available range of the robot 23). For example, an infrared sensor, a scattered reflection sensor or the like can be used.

(Worker Terminal)

Next, the composition of the worker terminal used by the worker is described. In the embodiment, a wearable worker terminal available for the worker to wear is used. Specifically, the worker terminal includes a head-mounted head unit (FIG. 3) mounted on the head and an arm unit (FIG. 4) mounted to the arm.

(1) Head Unit

Figure 3:
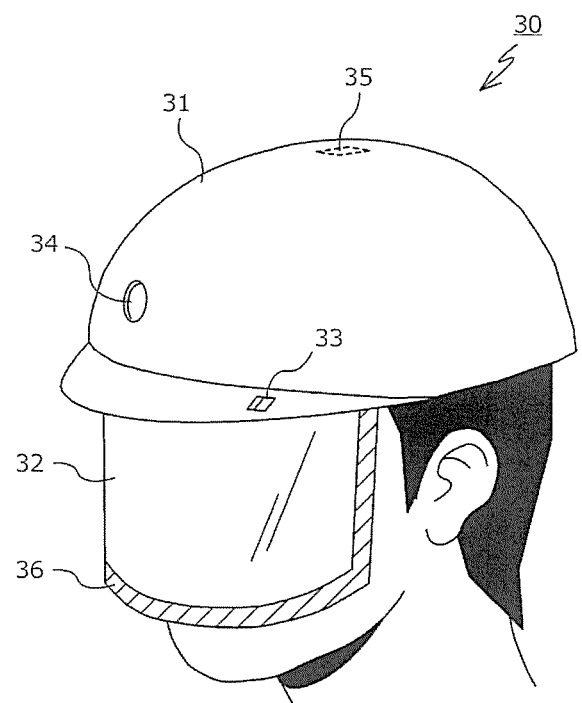
FIG. 3 is a three-dimensional diagram that schematically indicates a composition example of a head unit of a worker terminal.

As shown in FIG. 3, the head unit 30 includes a helmet-type head unit body 31, and a see-through head-mounted display (hereinafter referred to as "see-through display") 32 mounted to a front surface of the head unit body 31. The see-through type includes "video see through" that achieves virtual see-through through an image reflecting a camera, "optical see through" that uses an optical member such as a half mirror or uses a transparent display and so on, and may be any of them. In addition, a display type head-mounted display may not be used, but a projection type head-mounted display is used.

The head unit body 31 is provided with a power switch 33, a front camera 34, and a gyro sensor 35. Moreover, a computer (control part) with functions of a signal processing/image processing unit, a central processing unit, a storage unit, a wireless communications unit and so on is disposed in the head unit body 31, which will be described in detail in FIG. 5.

The power switch 33 is a switch for switching power ON/OFF of the head unit 30, and is configured in a position that may not be incorrectly touched by the worker in work such as an edge of a helmet. The front camera 34 is a camera that shoots an image in a gazing direction (the direction that the head faces directly) of the worker. When it is of a video see through type, the image acquired from the front camera 34 is displayed on the see-through display 32. The gyro sensor 35 is an angular velocity sensor for sensing head movement of the worker and is mounted to the top of the head. In addition, a three-axis acceleration sensor may also be disposed in place of the gyro sensor 35 or disposed together with the gyro sensor 35. The acceleration sensor may also be used for sensing head movement.

The see-through display 32 is provided with a target robot prompt part 36 along an edge thereof. The target robot prompt part 36 is a luminous body that lights on with an identification color of a robot as a cooperative object (target robot), including, for example, an LED. In addition, in the embodiment, the see-through display 32 and the target robot prompt part 36 are composed of different devices, but the see-through display 32 may also have the function of the target robot prompt part by making a part thereof display an image in a color the same as the identification color.

(2) Arm Unit

Figure 4:
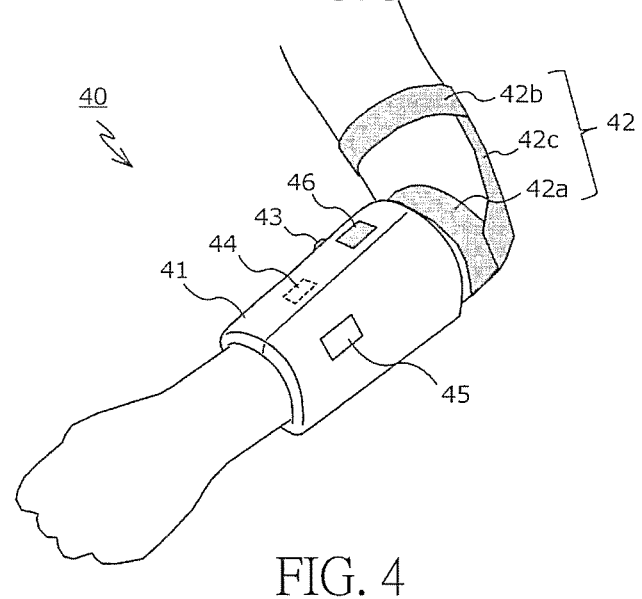
FIG. 4 is a three-dimensional diagram that schematically indicates a composition example of an arm unit of a worker terminal.

As shown in FIG. 4, the arm unit 40 includes an arm unit body 41 mounted to the front arm of the worker and a fixing band 42 for fixing the arm unit body 41. FIG. 4 indicates a condition that the arm unit 40 is mounted to the left arm, but may also be mounted to the right arm.

The arm unit body 41 is provided with a power switch 43, a myoelectric sensor 44, a Radio Frequency Identification (RFID) reader 45 and a target robot prompt part 46. Moreover, a computer (control part) with functions of a signal processing unit, a central processing unit, a storage unit, a wireless communications unit and so on is disposed in the arm unit body 41, which will be described in detail in FIG. 5.

The power switch 43 is a switch for switching power ON/OFF of the arm unit 40, and configured in a position that may not be incorrectly touched by the worker in work such as on an inner side surface of the arm unit body 41. The myoelectric sensor 44 is a sensor that senses myoelectric potential of the front arm of the worker, and mounted to a part of the arm unit body 41 in contact with a skin surface of the front arm. The RFID reader 45 is a sensor for reading a robot ID from the IC tag 25 (refer to FIG. 2) mounted to the working platform 20. The target robot prompt part 46 is a luminous body lit on with an identification color of a robot as a cooperative object (target robot), including, for example, an LED. The target robot prompt part 46 is controlled to be linked with the target robot prompt part 36 of the head unit 30 (emit light in the same color).

The fixing band 42 includes a front arm band 42a wound around the front arm, an upper arm band 42a wound around the upper arm, and a connecting band 42c that can elastically connect the front arm band 42a with the upper arm band 42a. The structure of the fixing band 42 has the following function: fixing the arm unit body 41 without being detached from the front arm, mounting the arm unit body 41 to the front arm towards a correct direction, and only mounting one arm unit 40. Use of the fixing band 42 causes the arm unit 40 not to be incorrectly mounted physically. Thus, safety of the cooperative work with the robot in the system can be improved.

(Functional Composition)

Figure 5:
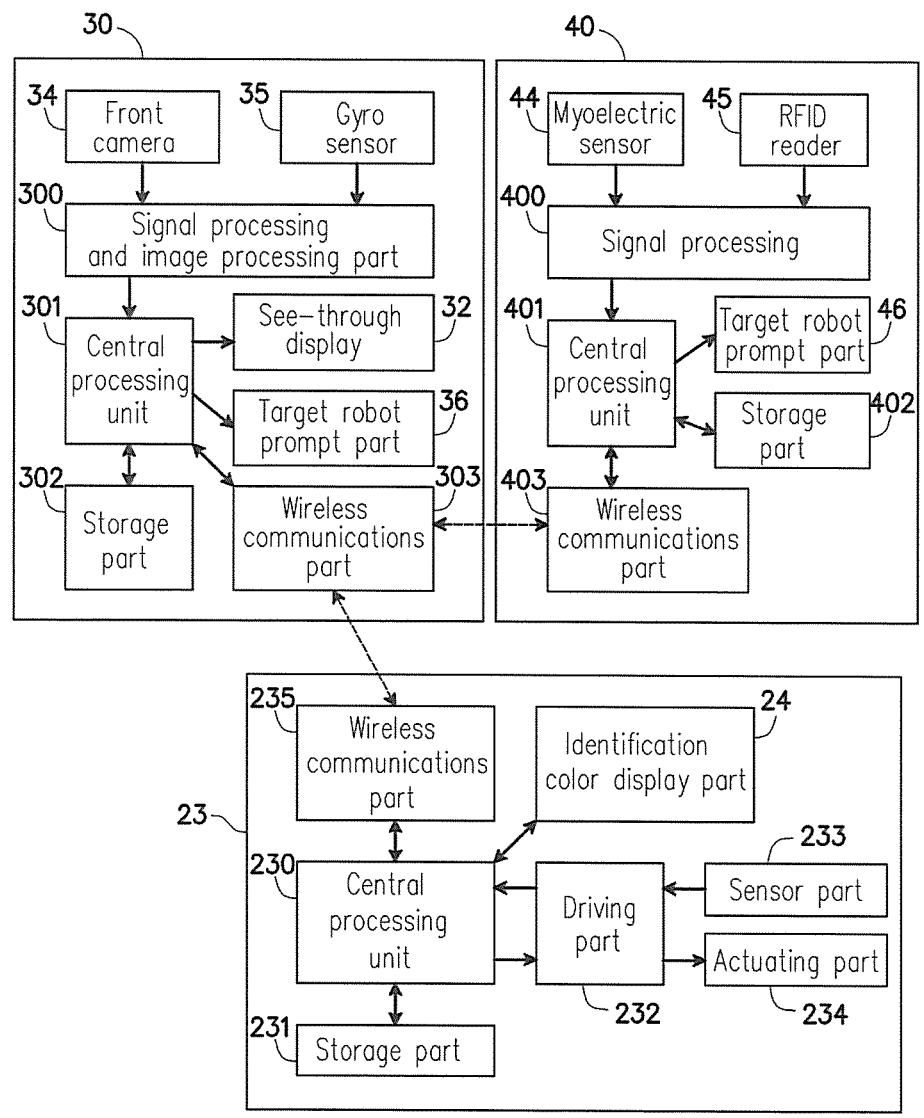
FIG. 5 is a functional block diagram of a robot control system.

FIG. 5 is a block diagram of functional composition of the robot control system of the embodiment. In FIG. 5, like symbols are marked for parts with the same composition shown in FIG. 2 to FIG. 4. In addition, the robot control system, as shown in FIG. 1, includes multiple robots, but for ease of description, only the composition of one robot 23 is indicated in FIG. 5.

The robot 23 includes a central processing unit 230, a storage part 231, a driving part 232, a sensor part 233, an actuating part 234, a wireless communications part 235 and an identification color display part 24. The central processing unit 230 is a processor that performs various operational processing or makes control over blocks of the robot 23 by reading and executing a program stored in the storage part 231. The storage part 231 includes a non-volatile memory that stores a program such as firmware or various set parameters, and a volatile memory that can be used as a working memory of the central processing unit 230.

The driving part 232 is a control circuit including a circuit that inputs a sensor signal from the sensor part 233 and a circuit that outputs a driving signal to the actuating part 234. The sensor part 233 is an input device for acquiring information used in the control over the robot 23. The actuating part 234 is an output device that drives the arm, the hand, the tool and the like of the robot 23. The sensor includes various types of sensors such as a light sensor, a sound sensor, a vibration sensor, a temperature sensor, a force sensor (tactile sensor), and a distance sensor, and a desired number and type of the sensor can be set according to the composition or operation content of the robot 23. Moreover, the actuator also includes various types such as a servo motor, a linear actuator, and a solenoid, and a desired number and type of the actuator can be set according to the composition or operation content of the robot 23. The wireless communications part 235 is a module for conducting wireless communication with the head unit 30 of the worker terminal.

The head unit 30 of the worker terminal includes a see-through display 32, a front camera 34, a gyro sensor 35, a signal processing/image processing part 300, a central processing unit 301, a storage part 302, a wireless communications part 303 and a target robot prompt part 36. The signal processing and image processing part 300 is a circuit that inputs a sensor signal of the gyro sensor 35 and an image signal of the front camera 34 and performs amplification, filtering, analog digital (AD) conversion and the like. The central processing unit 301 is a processor that performs various operational processing or makes control over the see-through display 32, the wireless communications part 303, the target robot 36 and the like by reading and executing a program stored in the storage part 302. The storage part 302 includes a non-volatile memory that stores a program such as firmware, set parameters such as threshold values set by the worker and reference image data for gesture identification, and a volatile memory that can be used as a working memory of the central processing unit 301. The wireless communications part 303 is a module for conducting wireless communication with the arm unit 40 and the robot 23.

The arm unit 40 of the worker terminal includes a myoelectric sensor 44, an RFID reader 45, a signal processing part 400, a central processing unit 401, a storage part 402, a wireless communications part 403 and a target robot 46. The signal processing part 400 is a circuit that inputs a sensor signal of the myoelectric sensor 44 and performs amplification, filtering, AD conversion and the like. The central processing unit 401 is a processor that performs various operational processing or makes control over the wireless communications part 403, the target robot prompt part 46 and the like by reading and executing a program stored in the storage part 402. The storage part 402 includes a non-volatile memory that stores a program such as firmware or various set parameters, and a volatile memory that can be used as a working memory of the central processing unit 401. The wireless communications part 403 is a module for conducting wireless communication with the head unit 30.

The wireless communication between the robot 23, the head unit 30 and the arm unit 40 may be conducted in any manner. For example, Institute of Electrical and Electronics Engineers (IEEE)802.11, IEEE802.15, infrared communication and the like are suitable.

(Identification and Control Over Target Robots)

Next, a flow of identifying and controlling target robots in the robot control system in the embodiment is described with reference to the sequence diagram of FIG. 6. Description is given below by taking a screwing operation on the third working platform on the cell production line of FIG. 1 as an example. However, reference can be made to the symbols used in FIG. 2 to FIG. 5 for the symbols of various constituents.

Firstly, the worker moves to the working platform 20 that performs a screwing operation, and uses the arm unit 40 to touch the IC tag 25 of the working platform 20 (S10). Then, the RFID reader 45 of the arm unit 40 reads the robot ID of the robot 23 recorded in the IC tag 25 (S40). The central processing unit 401 of the arm unit 40 sends the read robot ID to the head unit 30 through the wireless communications part 403 (S41). The central processing unit 301 of the head unit 30 stores the robot ID received from the arm unit 40 in the storage part 302 (S30). Then, the central processing unit 301 requests a communication connection from the robot 23 through the wireless communications part 303 (S31). At this point, the request message records the robot ID received in S30. The communication connection request may be received by the plurality of robots in a cell, but as the robot ID is specified in the request message, the robots can judge whether it is a connection request specific to themselves. In the example, only the robot 23 responds, and the central processing unit 230 of the robot 23 replies to the worker terminal (head unit 30) that the communication connection is permitted (S20). At this point, by recording the robot ID of the robot 23 in the reply message, the worker terminal (head unit 30) can be identified to be permitted to be connected with the robot 23 specific to the robot ID. The processing functions of S40 and S30-S31 of the worker terminal are functions of the identification part that identifies the target robot (the robot to be used for work by the worker) from the plurality of robots.

Then, the central processing unit 301 of the head unit 30 reads out the identification color corresponding to the robot ID from the storage part 302, making the target robot prompt part 36 become an ON status after lighting on and off several times according to the identification color (S32). Moreover, the central processing unit 301 notifies the arm unit 40 about the robot ID or the identification color through the wireless communications part 303 (S33). Then, the central processing unit 401 of the arm unit 40 makes the target robot prompt part 46 disposed in the arm unit 40 become an ON status after lighting on and off several times according to the identification color (S42). Afterwards, the worker terminal becomes an operation mode, and becomes a status that an operation instruction of the worker can be received.

On the other hand, at the robot 23 side, i.e., after a reply of permission of the communication connection is made in S20, the central processing unit 230 makes the identification color display part 24 become an ON status after lighting on and off several times according to the identification color (S21). Afterwards, the robot 23 also becomes an operation mode, and becomes a status that an operation command from the worker can be received.

Figure 7:
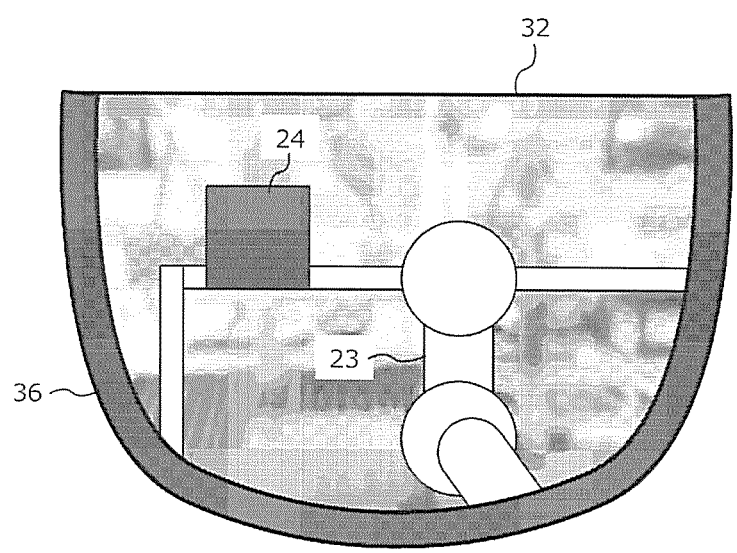
FIG. 7 is a diagram of field of view of a worker in an operation mode.

FIG. 7 is an example of the field of view of the worker in an operation mode, and indicates the field of view of the worker who sees the identification color display part 24 of the robot 23 across the see-through display 32. For example, when the identification color of the robot 23 is blue, the see-through display 32 is lit on with blue around (the target robot prompt part 36), and a color the same as that of the identification color display part 24 of the robot 23 can be seen. Moreover, although not shown, the target robot prompt part 46 of the arm unit 40 is also lit on with blue. Suppose that the target robot identified by the worker terminal side is different from the robot that the worker implies, the ON color at the worker terminal side is inconsistent with the identification color part at the robot side in the field of view, therefore, according to the composition of the embodiment, whether identification of the target robot is correctly performed can be directly and immediately confirmed. Moreover, a third party other than the worker (e.g., other workers in the same cell, the factory manager, etc.) can also see the ON color at the worker terminal side and the identification color at the robot side, and thus safety of the cooperative work and normal operations of the system can be managed and monitored objectively. In addition, the identification color display part 24 and the target robot prompt parts 36 and 46 further play a role of a communication establishing display lamp indicating that wireless communication can be conducted between the robot and the worker terminal.

Figure 6:
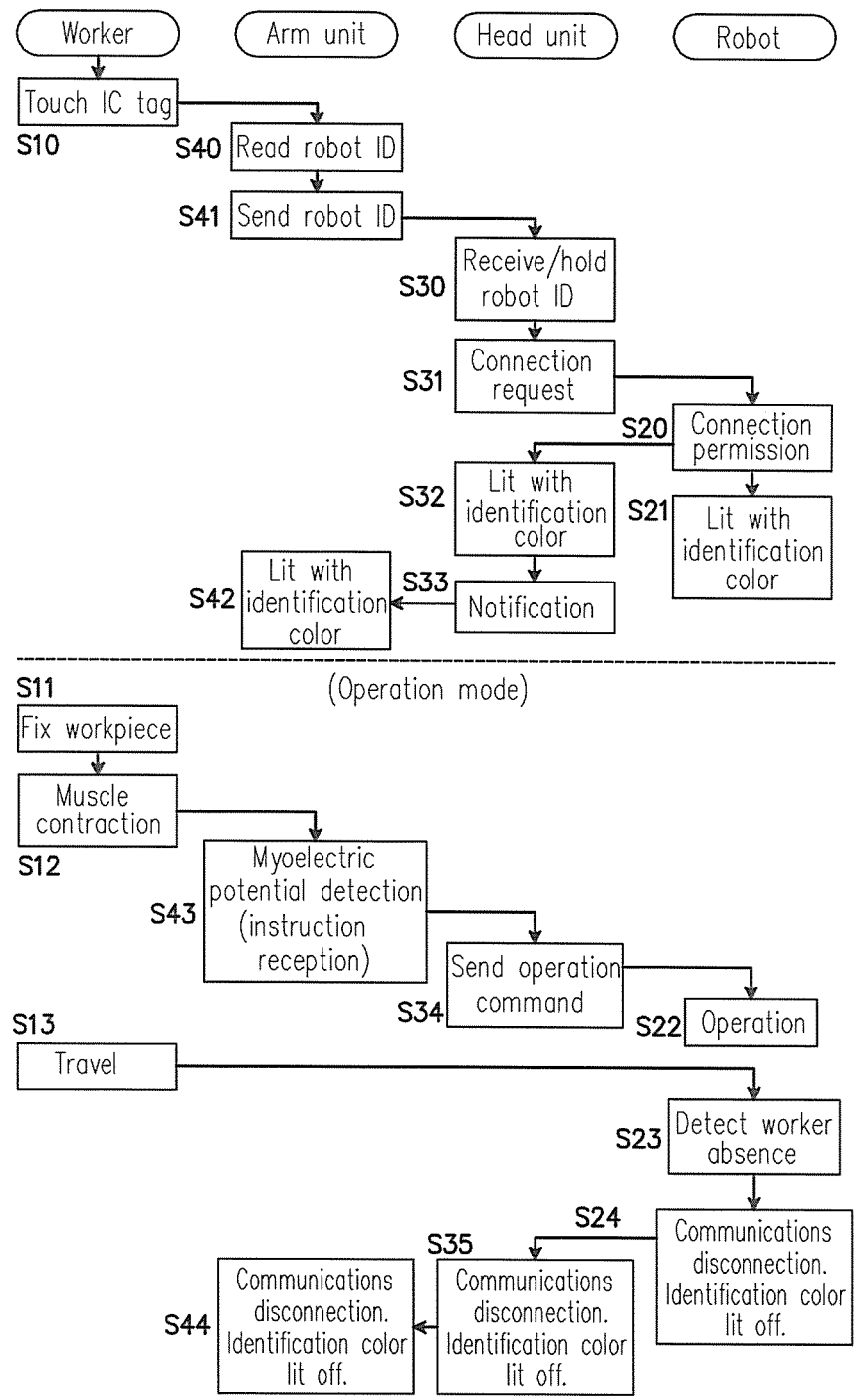
FIG. 6 is a control order of robots according to the first embodiment.

Back to FIG. 6, processing in the operation mode is described.

After confirming that the ON color at the worker terminal side is consistent with the ON color at the robot side, the worker configures a workpiece in a specified position of the working platform 20, and presses parts or cables as screwing objects with hands and fixes them (S11). Then, if the worker applies a force to the hand and makes muscle of the front arm contract (S12), the myoelectric sensor 44 of the arm unit detects rising of the myoelectric potential. The central processing unit 401 of the arm unit 40 is understood as "sending an operation instruction for the robot from the worker" when the myoelectric potential exceeds a threshold value, and notifies the head unit 30 (S43). In the embodiment, the processing function of S43 of the arm unit is a function of the reception part that receives operation instructions for the robot from the worker.

The central processing unit 301 of the head unit 30 sends an operation command to the robot 23 immediately upon receipt of the operation instructions from the worker (S34). At this point, the command message records the robot ID stored in S30. The operation command may be received by the plurality of robots in the cell, but the command message specifies a robot ID, and thus each robot can judge whether it is an operation command for itself, and refuses the operation command not for itself.

In the example, after receiving the operation command, the robot 23 makes an electric driver on a front end of the arm vertically drop, to screw the parts or cables pressed by the worker (S22). When there are multiple screwing positions, the processing described in S11-S22 is repeated. According to the above contents, cooperative work between the worker and the robot 23 can be performed smoothly.

Before and after the worker accomplishes the operation and leaves the working platform 20 (S12), the human-sensing sensor 26 senses the absence of the worker (there is no worker within an available range of the robot 23) (S23). Then, the central processing unit 230 of the robot 23, after notifying the worker terminal to cut off wireless communication, cuts off the communication with the robot 23, making the identification color display part 24 lit off (S24). On the other hand, the worker terminal also cuts off the communication with the robot 23, making the target robot prompt parts 36 and 46 lit off (S35, S44).

Advantages of the Embodiment

According to the composition of the embodiment, the worker terminal sends operation commands to only the robot identified as the target robot, and thus the malfunction of the robot implied by the worker can be prevented. Moreover, operation commands are wirelessly sent to the target robot according to an operation instruction of the worker, and thus the target robot can operate according to the timing required by the worker, which can thus implement efficient cooperative work between the worker and the robot.

In the embodiment, an operation instruction can be sent to the robot according to myoelectric potential (only applying a force to the hand) without pressing down a button or controlling a pull rod. Therefore, in the case of pressing a workpiece or in a state that things are held with two hands, a signal can be sent to the robot with the required timing simply and without activity loss. Moreover, the operation instruction can be input for any robot with the same operation, and thus availability (operability) and work efficiency of the worker can be enhanced.

Moreover, by disposing the human-sensing sensor 26, wireless communication will be actively cut off when the worker leaves the working platform 20, and thus malfunction of the robot (sending operation commands to a robot not implied) can be further suppressed, which thus can ensure safety of cooperative work between humans and robots. Besides, when the worker leaves the working platform 20, the wireless communication is not cut off but controlled to prohibit the operation of the robot 23, which can achieve the same effect.

Second Embodiment

Next, the second embodiment of the present invention is described. In the first embodiment, the robot identification mark is an IC tag, while different from the first embodiment, a two-dimensional code is employed in the second embodiment. The compositions except this are the same as those of the first embodiment, and thus the following description focuses on different constituents.

Figure 8:
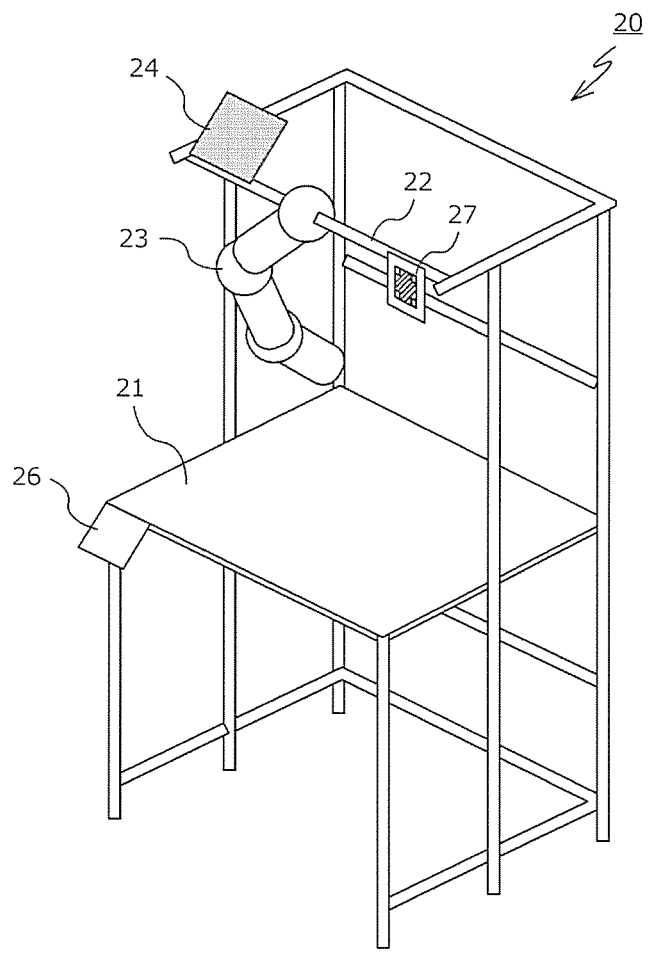
FIG. 8 is a three-dimensional diagram that schematically indicates a composition example of a working platform according to a second embodiment.

FIG. 8 schematically illustrates a composition example of a working platform according to the embodiment. The embodiment is different from the first embodiment (FIG. 2)

in that: there is no IC tag; instead, a two-dimensional code 27 recording a robot ID of the robot 23 is attached to the working platform 20 or the robot 23. The composition of the worker terminal may be the same as that of the first embodiment (FIG. 3, FIG. 4) (however, the RFID reader of the arm unit 40 may also be absent).

Figure 9:
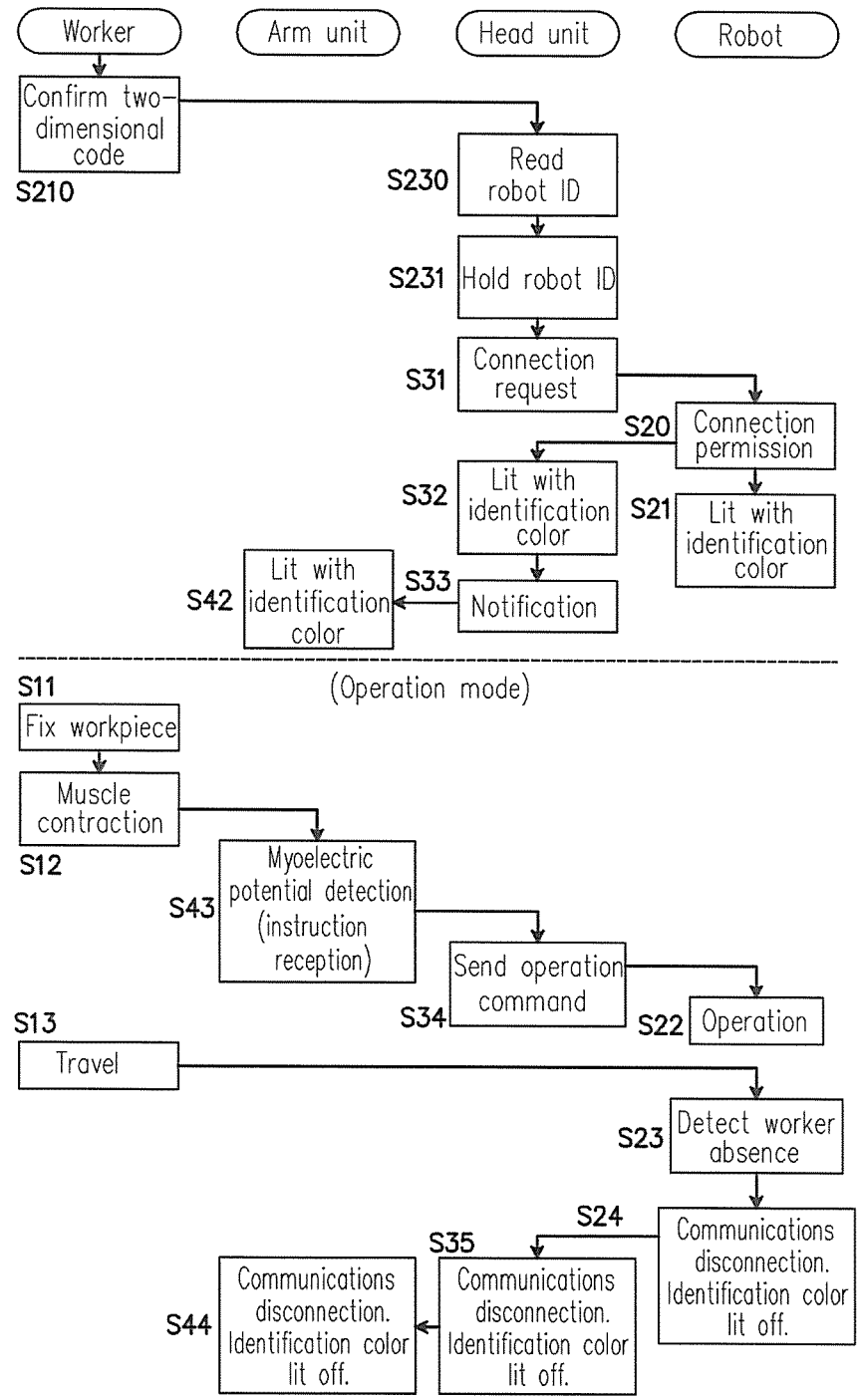
FIG. 9 is a control order of robots according to the second embodiment.

FIG. 9 is a control order of robots according to the embodiment. The order is only different from the order of the first embodiment (FIG. 6) in identification of the target robot.

Firstly, the worker moves to the working platform 20 that performs screwing, and sees the two-dimensional code 27 (S210). Then, an image of the two-dimensional code 27 is acquired by using the front camera 34 of the head unit 30, and the central processing unit 301 reads the robot ID from the two-dimensional code 27 (S230). The central processing unit 301 stores the read robot ID in the storage part 302 (S231). The subsequent processing is the same as that in the first embodiment (FIG. 6), and thus the same step numbers are marked and description is omitted.

According to the composition of the second embodiment, an effect the same as that of the first embodiment may also be achieved. Moreover, in the second embodiment, the target robot is identified (reading of the robot ID) through a combination of the two-dimensional code and the camera, and thus, compared with the composition that uses the IC tag and the RFID reader, the second embodiment also has the following advantages: the operation is simpler (it is unnecessary to touch the IC tag) and the weight and cost of the arm unit can be reduced (the RFID reader is not required).

In addition, when incorrect identification may be caused by writing two-dimensional codes of other robots within the field of view of the front camera 34, for example, an identification condition of the target robot can be limited strictly, for example, the robot ID is read only when a vertical and horizontal dimension of the two-dimensional code in the image of the front camera 34 is greater than a specified value, detection results of the human-sensing sensor 36 are combined and so on.

Third Embodiment

Next, the third embodiment of the present invention is described. In the first embodiment, a robot identification mark is disposed at a working platform side (robot side), and a reader is disposed at a worker terminal side, while this is opposite in the third embodiment, that is, a terminal identification mark is disposed at a worker terminal side, and a reader is disposed at a working platform side (robot side). The compositions except this are the same as those of the first embodiment, and thus the following description focuses on different constituents.

Figure 10:
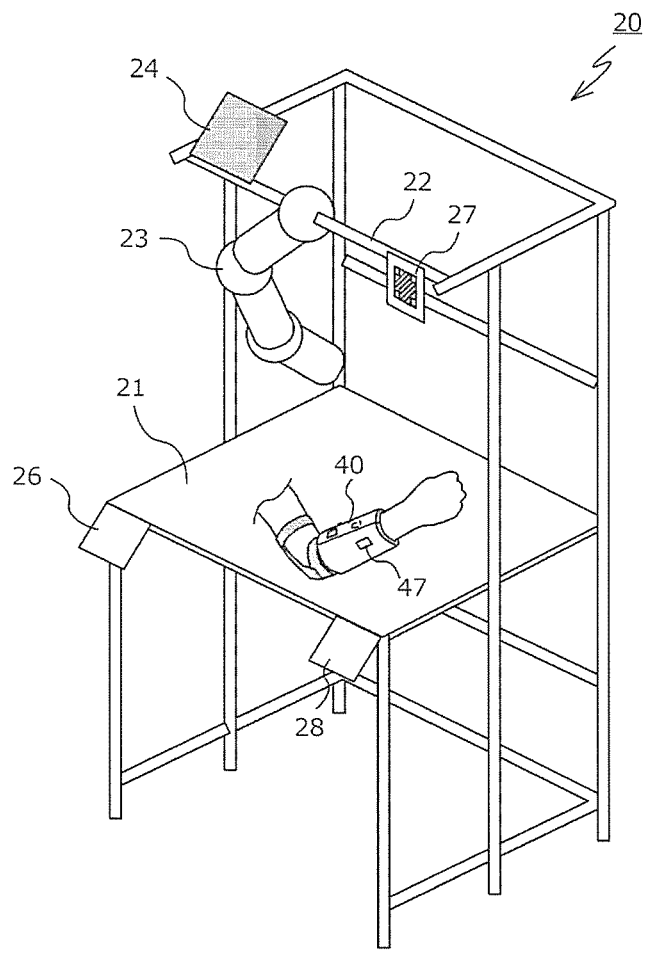
FIG. 10 is three-dimensional diagram that schematically indicates a composition example of working platforms and a worker terminal (arm unit) according to a third embodiment.

FIG. 10 schematically illustrates a composition example of working platforms and a worker terminal (arm unit) according to the embodiment. The embodiment is different from the first embodiment (FIG. 2) in that: an RFID reader 28 is disposed on the working platform 20 to replace the IC tag; the arm unit 40 has an IC tag 47 to replace the RFID reader. The IC tag 47 records a terminal ID specific to the worker terminal.

Figure 11:
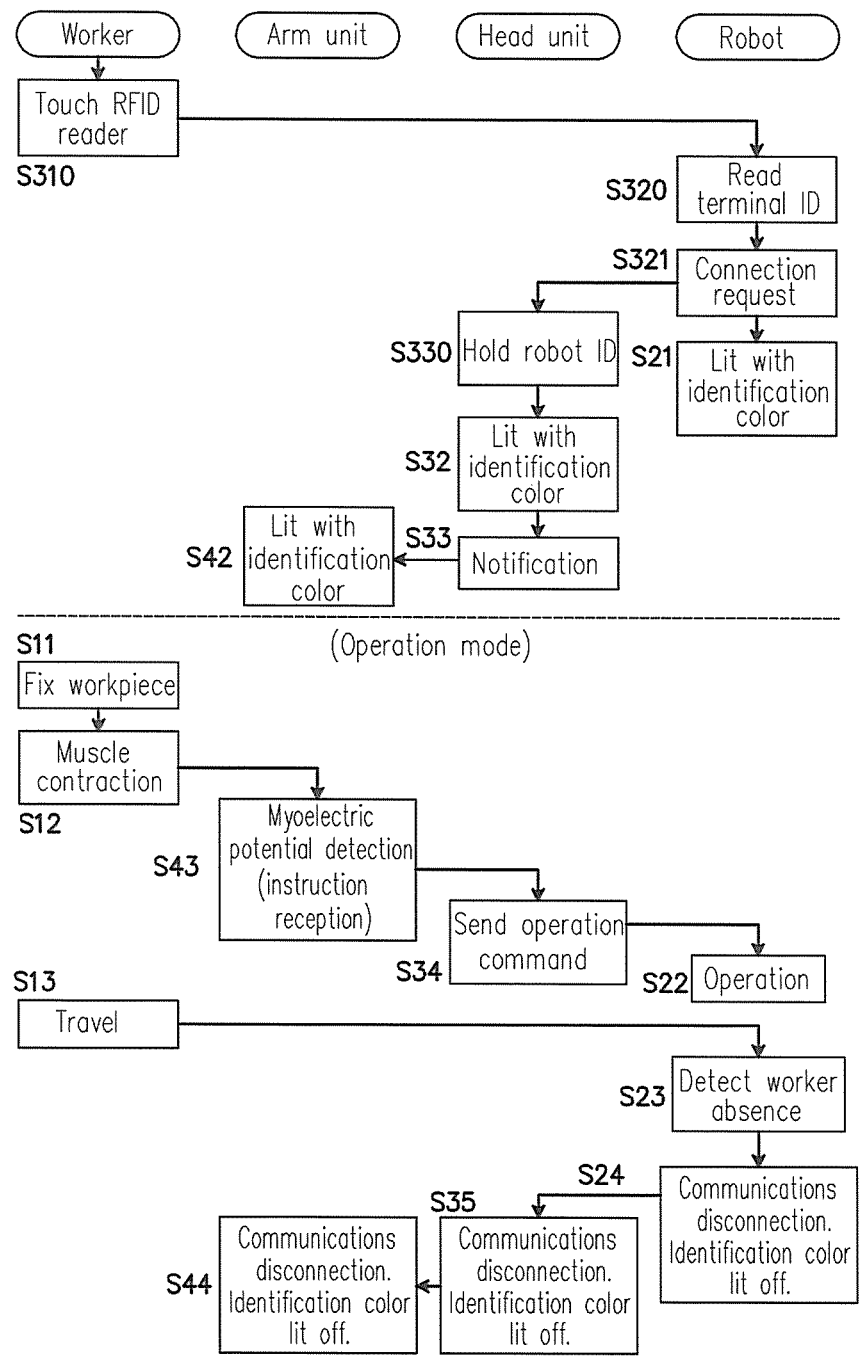
FIG. 11 is a control order of robots according to the third embodiment.

FIG. 11 is a control order of robots according to the embodiment. The order is only different from the order of the first embodiment (FIG. 6) in identification of the target robot.

Firstly, the worker moves to the working platform 20 that performs screwing, and uses the arm unit 40 to touch the RFID reader 28 of the working platform 20 (S310). Then, the RFID reader 28 reads the terminal ID recorded in the IC tag 47 of the arm unit (S320). The central processing unit 230 of the robot 23 requests a communication connection from a worker terminal specific to the terminal ID through wireless communication (S321). At this point, the request message records the terminal ID read in S320 and its own robot ID. Upon receipt of the connection request, the worker terminal (head unit 30) confirms according to the terminal ID that it is a request for the terminal, and then identifies the robot ID of the target robot (S330). Thus, communication is established between the robot 23 and the worker terminal. The subsequent processing is the same as that of the first embodiment (FIG. 6), and thus the same step numbers are marked and description is omitted. Besides, in the embodiment, the processing functions of S320-S321 of the robot 23 are functions of the ID notification part that notifies the worker terminal about its own robot ID.

According to the composition of the third embodiment, an effect the same as that of the first embodiment may also be achieved. Moreover, the third embodiment does not require the RFID reader at the arm unit side, and thus also has the following advantage: the weight and cost of the arm unit can be reduced.

In addition, the identification method that uses a two-dimensional code and a camera in the second embodiment can also be applied to the third embodiment. That is to say, the two-dimensional code recording the terminal ID is attached to the head unit 30 or the arm unit 40 of the worker terminal, and the two-dimensional code is read by using the camera disposed on the working platform 20 or the robot 23. Such composition can also perform processing the same as that of the third embodiment.

Fourth Embodiment

Next, the fourth embodiment of the present invention is described. The target robot is automatically identified in the first to third embodiments, while the fourth embodiment employs a composition that a worker specifies (selects) the target robot. The compositions except this are the same as those of the first embodiment, and thus the following description focuses on different constituents.

Figure 12:
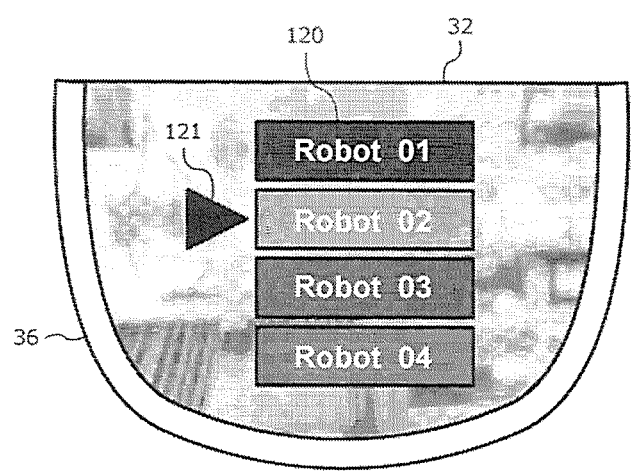
FIG. 12 is a diagram that describes a selection method of a target robot in a fourth embodiment.

After the worker instructions switching the target robot or the worker moves between the working platforms, the operating interface shown in FIG. 12 is displayed on the see-through display 32 of the worker terminal. Specifically, a candidate list 120 of useable (communicable) target robots is prompted, and the worker can select a robot to be used from the candidate list 120. At this point, robot IDs and identification colors of the robots can be prompted in the candidate list 120. The reason lies in that: through display in different colors, it is easy to identify robots, so that the worker's incorrect selection for the robots can be reduced.

The operation of selecting a robot from the candidate list 120 is performed by using a hand gesture of the front camera 34. For example, any of the following operating methods can be used: moving a hand or finger up and down within the field of view of the front camera 34 to cause a cursor on the candidate list 120 to move so as to select a target robot; making hand gestures corresponding to the robots (e.g., raise one finger when the robot ID is "01", raise two fingers when the robot ID is "02" and so on).

In addition, hand gestures are used in the embodiment, but the selection operation of the robot may also be performed with other methods. For example, it may be a method of selecting a robot by using a gyro sensor 35 and through head movement (nod, shake the head, etc.); it may be a method of selecting a robot by using a myoelectric sensor 44 and through movement of the front arm; a selection may also be made by sound input or a button and so on.

Other Embodiments

The embodiment indicates a specific example of the present invention, but is not intended to limit the scope of the present invention to the specific examples.

For example, the input method of an operation instruction for the robot is not limited to myoelectric potential. For example, the operation instruction may also be input by using the gyro sensor 35 disposed in the head unit 30 and through the worker's head movement (nod, shake the head, etc.). Moreover, sound input, lip or palate movement input, gaze input, gesture input and the like may also be used. Besides, to ensure feasible input, multiple input methods may also be combined.

In the embodiment, the identification color display part 24 of the working platform is composed of devices that can be lit on/off, but the identification color display part may also be composed of a color-attached member such as a color panel. Alternatively, all or some of the robot or the working platform may also be formed by members in identification colors. That is to say, the objective can be achieved as long as the identification colors are strikingly prompted as much as possible in the position within the field of view of the worker.

In the embodiment, the target robot is identified with an IC tag or two-dimensional code, but other methods may also be used. For example, a robot ID may also be depicted on the working platform or the robot body, and the robot ID is identified through image identification by using the image acquired by the front camera of the head unit 30. Alternatively, the target robot may also be identified by identifying objects according to the color (identification color) or shape or other features of the working platform or the robot body.

In the embodiment, a wearable worker terminal is illustrated, but the form of the worker terminal is not limited thereto, which may also be a worker terminal for the worker to hold (handhold). Preferably, for example, a portable computer such as a smart phone or a tablet terminal is used as the worker terminal.

DESCRIPTION OF SYMBOLS

10*a*, 10*b*: worker
11-16, 20: working platform
11*a*, 12*a*, 13*a*, 15*a*, 16*a*, 23: robot
24: identification color display part
25: IC tag
26: human sensing sensor
27: two-dimensional code
28: RFID reader
30: head unit
32: see-through display
34: front camera
35: gyro sensor
36: target robot prompt part
40: arm unit
44: myoelectric sensor
45: RFID reader
46: target robot prompt part
47: IC tag

What is claimed is:

1. A robot control system, for causing a worker to use a plurality of robots to distinguish work in a work space provided with the robots, wherein the robot control system comprises:
    a plurality of robots; and
    a worker terminal that is capable of sending operation commands to the plurality of robots, by using wireless communications;
    each of the plurality of robots is a robot that cooperates with the worker in one work and performs some operations undertaken by the robot, among multiple operations required for achieving the one work, with a timing receiving the operation command from the worker terminal,
    the worker terminal has:
        an identification part that identifies a target robot to be used for work among a plurality of robots;
        a reception part that receives operation instructions for the robot from a worker; and
        a wireless communications part that sends operation command to only the robot identified as the target robot by the identification part when an operation instruction is received by the reception part.

2. The robot control system according to claim 1, further comprising a target robot prompt part that prompts information indicating which of the plurality of robots is identified as the target robot.

3. The robot control system according to claim 2, wherein
    the plurality of robots are assigned with identification colors, respectively, and
    the target robot prompt part is an element lit on in a color the same as an identification color of the target robot.

4. The robot control system according to claim 3, wherein
    each of the plurality of robots has an identification color display part that displays an identification color,
    the worker terminal has a see-through head-mounted display, and
    the target robot prompt part is an element that makes an image in a color the same as the identification color of the target robot displayed on the head-mounted display, or an element mounted on the head-mounted display that shines in a color the same as the identification color of the target robot within the field of view of the worker.

5. The robot control system according to any of claims 1, 2 and 3, wherein
    each of the plurality of robots has a robot identification mark recording a robot ID,
    the worker terminal has a reader that reads the robot ID from the robot identification mark, and
    the identification part identifies the target robot by reading the robot ID from the robot identification mark within a read range of the reader.

6. The robot control system according to any of claims 1, 2 and 3, wherein
    the worker terminal has a terminal identification mark recording a terminal ID,
    each of the plurality of robots has a reader that reads the terminal ID from the terminal identification mark, and
    an ID notification part that notifies a worker terminal specific to the terminal ID read by the reader about its own robot ID, and
    the identification part identifies the target robot by obtaining the robot ID from the ID notification part.

7. The robot control system according to any of claims 1, 2 and 3, wherein the identification part identifies the target robot by prompting a plurality of candidates of the target robot to the worker and selecting a target robot for the worker among the plurality of candidates.

8. The robot control system according to any of claims 1, 2 and 3, wherein each of the plurality of robots has a human-sensing sensor and a control part, and the control part stops communication with the worker terminal or operation of the robot when the human-sensing sensor detects that the worker is not within an available range of the robot.

9. The robot control system according to any of claims 1, 2 and 3, wherein
    each of the plurality of robots is a robot that uses receiving of an operation command from the worker terminal as a trigger to perform a determined operation, and
    the operation instruction can be input with the same operation no matter which robot the target robot is.

* * * * *